(12) United States Patent
Tantsura et al.

(10) Patent No.: US 11,271,855 B2
(45) Date of Patent: *Mar. 8, 2022

(54) USING BORDER GATEWAY PROTOCOL TO EXPOSE MAXIMUM SEGMENT IDENTIFIER DEPTH TO AN EXTERNAL APPLICATION

(71) Applicant: Telefonaktiebolaget LM Ericsson (publ), Stockholm (SE)

(72) Inventors: Evgeny Tantsura, Palo Alto, CA (US); Gregory Mirsky, Pleasanton, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 25 days.

This patent is subject to a terminal disclaimer.

(21) Appl. No.: 16/869,391

(22) Filed: May 7, 2020

(65) Prior Publication Data

US 2020/0267079 A1 Aug. 20, 2020

Related U.S. Application Data

(63) Continuation of application No. 15/947,737, filed on Apr. 6, 2018, now Pat. No. 10,673,753, which is a
(Continued)

(51) Int. Cl.
*H04L 12/721* (2013.01)
*H04L 12/751* (2013.01)
(Continued)

(52) U.S. Cl.
CPC ............. *H04L 45/72* (2013.01); *H04L 45/02* (2013.01); *H04L 45/507* (2013.01)

(58) Field of Classification Search
None
See application file for complete search history.

(56) References Cited

U.S. PATENT DOCUMENTS 7,940,695 B1 5/2011 Bahadur et al.
9,660,897 B1 5/2017 Gredler
(Continued)

FOREIGN PATENT DOCUMENTS

CN 102857422 A 1/2013
JP 2005-318409 A 11/2005
(Continued)

OTHER PUBLICATIONS

RFC 5405: Eggert L., et al., "Unicast UDP Usage Guidelines for Application Designers," 2008, 27 pages, Network Working Group, IETF Trust, Request for Comments: 5405.
(Continued)

*Primary Examiner* — Jay L Vogel
(74) *Attorney, Agent, or Firm* — Nicholson, De Vos, Webster & Elliott, LLP

(57) ABSTRACT

A method of exposing a maximum segment identifier depth (MSD) value of the network device is described. The method comprises transmitting to a centralized controller an attribute Type Length Value (TLV). A type of the attribute TLV includes a type of a maximum segment identifier depth (MSD) indicating that the MSD is a link MSD, a length of the attribute TLV includes a length of the MSD, and a value of the attribute TLV includes the MSD, which is a maximum number of segment routing (SR) labels supported at a link of the network node. The centralized controller is to use the attribute TLV to compute an SR tunnel with one or more SR labels, a label stack depth of the SR tunnel does not exceed the MSD, and the SR labels are used for steering a packet through an SR network.

30 Claims, 7 Drawing Sheets

Related U.S. Application Data continuation of application No. 14/846,342, filed on Sep. 4, 2015, now Pat. No. 9,967,184.

(60) Provisional application No. 62/188,402, filed on Jul. 2, 2015.

(51) Int. Cl.
*H04L 12/723* (2013.01)
*H04L 45/00* (2022.01)
*H04L 45/02* (2022.01)
*H04L 45/50* (2022.01)

(56) References Cited

U.S. PATENT DOCUMENTS

| | | | |
|---|---|---|---|
| 9,967,184 B2* | 5/2018 | Tantsura | H04L 45/72 |
| 10,673,753 B2* | 6/2020 | Tantsura | H04L 45/72 |
| 2009/0144443 A1 | 6/2009 | Vasseur et al. | |
| 2013/0235716 A1 | 9/2013 | Vasseur | |
| 2014/0136714 A1* | 5/2014 | Garcia De Blas | H04L 67/125 709/226 |
| 2014/0254596 A1 | 9/2014 | Filsfils et al. | |
| 2014/0269266 A1 | 9/2014 | Filsfils et al. | |
| 2015/0003458 A1 | 1/2015 | Li et al. | |
| 2015/0089081 A1 | 3/2015 | Thubert et al. | |
| 2015/0103844 A1 | 4/2015 | Zhao et al. | |
| 2015/0304206 A1* | 10/2015 | Filsfils | H04L 45/04 709/238 |
| 2016/0014025 A1 | 1/2016 | Wang | |
| 2016/0359728 A1* | 12/2016 | Ficara | H04L 63/00 |
| 2017/0180247 A1* | 6/2017 | Lin | H04L 45/74 |

FOREIGN PATENT DOCUMENTS

| | | |
|---|---|---|
| RU | 2507698 C2 | 2/2014 |
| WO | 2014/055968 A1 | 4/2014 |
| WO | 2015/173669 A1 | 11/2015 |

OTHER PUBLICATIONS

RFC 5865: Baker F., "A Differentiated Services Code Point (DSCP) for Capacity-Admitted Traffic," May 2010, 14 pages, Internet Engineering Task Force (IETF), IETF Trust, Request for Comments: 5865.
RFC 768: Postel, "User Datagram Protocol," Aug. 28, 1980, 3 pages, Network Working Group, Request for Comments: 768.
RFC 793: Postel J., "Transmission Control Protocol," Sep. 1981, 91 pages, DARPA Internet Program Protocol Specification, Request for comments: 793.
S. Bradner, "Key words for use in RFCs to Indicate Requirement Levels", Network Working Group, Request for Comments: 2119, Mar. 1997, 3 pages.
Sivabalan et al., "PCEP Extensions for Segment Routing, draft-ietf-pce-segment-routing-06.txt," Network Working Group, Internet-Draft, Aug. 9, 2015, pp. 1-21.
Sivabalan S., et al., "PCEP Extensions for Segment Routing, draft-ietf-pce-segment-routing-05.txt," Network Working Group, Internet-Draft, May 31, 2015, pp. 1-21.
Sivabalan S., et al., "PCEP Extensions for Segment Routing, draft-ietf-pce-segment-routing-OO.txt," Network Working Group, Internet-Draft, Oct. 26, 2014, 18 pages.
Tantsura et al., "Signaling Maximum SID Depth using Border Gateway Protocol Link-State, draft-tantsura-bgp-ls-segment-routing-msd-00", IDR Working Group, Internet-Draft, Jul. 6, 2015, pp. 1-5.
Tantsura J., et al., "Signaling Maximum SID Depth using Border Gateway Protocol Link-State, draft-tantsura-bgp-ls-segment-routing-msd-01," IDR Working Group, Internet-Draft, Jan. 8, 2016, 5 pages.
Tantsura J., et al., "Signaling MSD (Maximum SID Depth) using OSPF, draft-tantsura-ospf-segment-routing-msd-00," OSPF Working Group, Internet-Draft, Mar. 8, 2016, 6 pages.

Vasseur et al., "Intermediate System to Intermediate System (IS-IS) Extensions for Advertising Router Information", Network Working Group, Request for Comments: 4971, Jul. 2007, pp. 1-9.
Wroclawski, J., "Specification of the Controlled-Load Network Element Service," Sep. 1997, Network Working Group, Request for Comments: 2211, 19 pages.
Wroclawski, J., "The Use of RSVP with IETF Integrated Services," Sep. 1997, Network Working Group, Request for Comments: 2210, 33 pages.
Xu et al., "Signaling Entropy Label Capability Using IS-IS, draft-ietf-isis-mpls-elc-00", Network Working Group, Internet-Draft, May 19, 2015, pp. 1-5.
Xu et al., "Signaling Entropy Label Capability Using OSPF, draft-ietf-ospf-mpls-elc-00", Network Working Group, Internet-Draft, Apr. 20, 2015, pp. 1-5.
Xu X., et al., "Signaling Entropy Label Capability Using OSPF, draft-ietf-ospf-mpls-elc-01," Network Working Group, Internet Draft, Nov. 9, 2015, 5 pages.
Y. Rekhter, et al., "A Border Gateway Protocol 4 (BGP-4)," Jan. 2006, 104 pages, Network Working Group, Request for Comments: 4271, The Internet Society.
Cabadas, Pablo Aguilar, "BGP-LS Extensions for Segment Routing support", PCE Prototype with Segment Routing and BGPLS Support, Universidad Carlos III de Madrid, 2014, pp. 73-75.
C. Filsfils et al., "Segment Routing Architecture; draft-ietf-spring-segment-routing-03", Network Working Group, Internet-Draft, May 28, 2015, pp. 1-19.
Filsfils et al., "Segment Routing Architecture, draft-ietf-spring-segment-routing-07," Network Working Group, Internet-Draft, Dec. 15, 2015, pp. 1-24.
Filsfils, et al., "Segment Routing with MPLS data plane, draft-ietf-spring-segment-routing-mpls-01," Network Working Group, Internet-Draft, May 29, 2015, 14 pages.
Filsfils et al., "Segment Routing Use Cases, draft-filsfils-spring-segment-routing-use-cases-01", Network Working Group, Internet-Draft, Oct. 21, 2014, 35 pages.
Gredler H., et al., "BGP Link-Slate extensions for Segment Routing draft-gredler-idr-bgp-ls-segment-routing extension- 02", Inter-Domain Routing, Internet-Draft, Oct. 16, 2014, pp. 1-11.
Gredler, H. et al., "North-Bound Distribution of Link-Slate and TE Information using BGP," Inter-Domain Routing Internet Draft, Oct. 16, 2015, draft-ietf-idr-ls-distribution-13, 48 pages.
Gredler, H. et al., "North-Bound Distribution of Link-Slate and TE Information using BGP," Inter-Domain Routing, Internet-Draft, Jun. 4, 2015, draft-ietf-idr-ls-distribution-11, 45 pages.
Katz et al., "Traffic Engineering (TE) Extensions to OSPF Version 2", Network Working Group, Request for Comments: 3630, Sep. 2003, pp. 1-14.
Li et al., "IS-IS Extensions for Traffic Engineering", Network Working Group, Request for Comments: 5305, pp. 1-17.
Lindem et al., "Extensions to OSPF for Advertising Optional Router Capabilities", Network Working Group, Request for Comments: 4970, Jul. 2007, pp. 1-13.
Lindem, A. et al., "OSPFv3 LSA Extendibility," Network Working Group Internet Draft, draft-ietfspf-osptv3-lsa-extend-09, Nov. 19, 2015, pp. 1-38.
McPherson et al., "Simplified Extension of Link State PDU (LSP) Space for IS-IS", Network Working Group, Request for Comments: 5311, pp. 1-12.
Previdi S., et al., "IS-IS Extensions for Segment Routing, draft-ietf-isis-segment-routing-extensions-05," IS-IS for IP ntemets, Jun. 30, 2015, 37 pages.
Przygienda et al., "M-ISIS: Multi Topology (MT) Routing in Intermediate System to Intermediate Systems (IS-ISs)", Network Working Group, Request for Comments: 5120, pp. 1-14.
Psenak, et al., "OSPF Extensions for Segment Routing; draft-ietf-ospf-segment-routing-extensions-05," Open Shortest Path First IGP, IETF Internet Draft, Jun. 26, 2015, 29 pages.
Psenak, P. et al., "OSPFv2 Prefix/Link Attribute Advertisement," IETF RFC 7684, Nov. 2015, pp. 1-16.
RFC 1058: Hedrick C., "Routing Information Protocol," 1988, 33 pages, Network Working Group, Request for Comments: 1058.

(56) References Cited

OTHER PUBLICATIONS

RFC 1142: Oran, "OSI IS-IS Intra-domain Routing Protocol," Feb. 1990, 157 pages, Network Working Group, Request for Comments: 1142.
RFC 1180: Socolofsky, et al., "A TCP/IP Tutorial," Network Working Group, Request for Comments: 1180, Jan. 1991, 28 pages.
RFC 2080: Malkin., et al., "RIPng for IPv6," Jan. 1997, 19 pages, Network Working Group, Request for Comments: 2080.
RFC 2205: Braden R., et al., "Resource ReSerVation Protocol (RSVP) Version 1 Functional Specification," 1997, 112 pages, Network Working Group, Request for Comment: 2205.
RFC 2212: Shenker., et al., "Specification of Guaranteed Quality of Service," 1997, 20 pages, Network Working Broup, Request for Comments: 2212.
RFC 2328: Moy, "OSPF Version 2," Apr. 1998, 244 pages, Network Working Group, Request for comments: 2328.
RFC 2453: Malkin, et al., "RIP Version 2," Nov. 1998, 39 pages, Network Working Group, Request for Comments: 2453.
RFC 2460: Deering S., et al., "Internet Protocol Version 6 (IPv6)," 1998, 39 pages, Network Working Group, Standards Track, Request for comments: 2460.
RFC 2474: Nichols K., "Definition of the Differentiated Services Field (DS Field) in the IPv4 and IPv6 Headers," 1998, 20 pages, Network Working Group, The Internet Society, Request for Comments: 2474.
RFC 2475: Blakes., "An Architecture for Differentiated Services," 1998, 36 pages, Network Working Group, The Internet Society, Request for Comments: 2475.
RFC 2597: Heinanen J., et al., "Assured Forwarding PHB Group," 1999, 11 pages, The Internet Society, Request for Comments: 2597.
RFC 2675: Borman D., "IPv6 Jumbograms," 1999, 9 pages, Network Working Group, The Internet Society, Request for Comments: 2675.
RFC 2983: Black D., "Differentiated Services and Tunnels," 2000, 14 pages, Network Working Group, The Internet Society, Request for Comments: 2983.
RFC 3086: Nichols K., et al., "Definition of Differentiated Services Per Domain Behaviors and Rules for their Specification," 2001, 24 pages, Network Working Group, Request for Comments: 3086.
RFC 3140: Black D., et al., "Per Hop Behavior Identification Codes," 2001, 8 pages, Network Working Group, Standards Track, Request for Comments: 3140.
RFC 3209: Awduche D., et al., "RSVP-TE: Extensions to RSVP for LSP Tunnels," 2001, 61 pages, Network Working Group, The Internet Society, Request for Comments: 3209.
RFC 3246: Davie B., et al., "An Expedited Forwarding PHB (Per-Hop Behavior)," 2002, 16 pages, The Internet Society, Request for Comments: 3246.
RFC 3247: Charny A., et al., "Supplemental Information for the New Definition of the EF PHB (Expedited Forwarding Per-Hop Behavior)," 2002, 24 pages, Network Working Group, The Internet Society, Request for Comments 3247.
RFC 3260: Grossman D., "New Terminology and Clarifications for Diffserv," 2002, 10 pages, Network Working Group, The Internet Society, Request for Comments: 3260.
RFC 3289: Baker F., et al., "Management Information Base for the Differentiated Services Architecture," 2002, 116 pages, Network Working Group, The Internet Society, Request for Comments: 3289.
RFC 3290: Bernet Y., et al., "An Informal Management Model for Diffserv Routers," 2002, 56 pages, Network Working Group, The Internet Society, Request for Comments: 3290.
RFC 3317: Chan K., et al., "Differentiated Services Quality of Service Policy Information Base," 2003, 96 pages, Network Working Group, The Internet Society, Request for Comments: 3317.
RFC 3473: Berger L., "Generalized Multi-Protocol Label Switching (GMPLS) Signaling Resource ReserVation Protocol-Traffic Engineering (RSVP-TE) Extensions," 2003, 42 pages, The Internet Society, Network Working Group, Request for Comments: 3473.
RFC 3936: Kompella., et al., "Procedures for Modifying the Resource reSerVation Protocol (RSVP)," 2004, 7 pages, The Internet Society, Network Working Group, Request for Comments: 3936.
RFC 4113: Fenner B., et al., "Management Information Base for the User Datagram Protocol (UDP)," 2005, 19 pages, Network Working Group, The Internet Society, Request for Comments: 4113.
RFC 4301: Kent S., et al., "Security Architecture for the Internet Protocol," Dec. 2005, 101 pages, The Internet Society, Network Working Group, Request for Comments: 4301.
RFC 4309: Housley., "Using Advanced Encryption Standard (AES) CCM Mode with IPsec Encapsulating Security Payload (ESP)," 2005, 13 pages, The Internet Society, Network Working Group, Request for Comments: 4309.
RFC 4364: Rosen, et al., "BGP/MPLS IP Virtual Private Networks (VPNs)," Feb. 2006, 47 pages, The Internet Society, Network Working Group, Request for Comments: 4364.
RFC 4495: Polk., et al., "A Resource Reservation Protocol (RSVP) Extension for the Reduction of Bandwidth of a Reservation Flow," 2006, 21 pages, The Internet Society, Network Working Group, Request for Comments: 4495.
RFC 4558: Ali., et al., "Node-ID Based Resource Reservation Protocol (RSVP) Hello: A Clarification Statement," 2006, 7 pages, Network Working Group, The Internet Society, Request for Comments: 4558.
RFC 4594: Babiarz J., et al., "Configuration Guidelines for DiffServ Service Classes," 2006, 57 pages, Network Working Group, Request for Comments: 4594.
RFC 5036: Andersson L., "LDP Specification," 2007, 135 pages, The EITF Trust, Network Working Group, Request for Comments: 5036.
RFC 5340: Coltun R., et al., "OSPF for IPv6," 2008, 94 pages, The IETF Trust, Network Working Group, Request for Comments: 5340.

\* cited by examiner

200

Encode the MSD value into a BGP Link State (BGP-LS) extension message, where the BGP-LS extension message includes a type, a length and a MSD value, and where the type indicates the type of the MSD value, the length indicates the length of the MSD value and the MSD value indicates a lowest MSD value supported by the network device for enabling segment routing
202

Transmit the BGP-LS extension message including the type, the length, and the MSD value to the network controller, wherein the network controller is to use the MSD value to compute a segment routing path including the network device
204

```
┌─────────────────────────────────────────────────────────────────────────┐
│ Receive from a network device acting as a border gateway protocol (BGP) │
│                 speaker, a BGP Link State (BGP-LS) extension message    │
│                                     302                                 │
└─────────────────────────────────────────────────────────────────────────┘
                                      │
                                      ▼
┌─────────────────────────────────────────────────────────────────────────┐
│ Decode the BGP-LS extension message, to extract a maximum segment       │
│ identifier depth (MSD) value of the network device, where the BGP-LS    │
│ extension message includes a type which indicates the type of the MSD   │
│ value, a length which indicates the length of the MSD value and a MSD   │
│ value which indicates a lowest MSD value supported by the network       │
│ device for enabling segment routing                                     │
│                                     304                                 │
└─────────────────────────────────────────────────────────────────────────┘
                                      │
                                      ▼
┌─────────────────────────────────────────────────────────────────────────┐
│ compute, using the MSD value, a segment routing (SR) path including the │
│ network device, where the SR path has a label stack depth that is lower │
│                    than or equal to the MSD value                       │
│                                     306                                 │
└─────────────────────────────────────────────────────────────────────────┘
```

Fig. 3

USING BORDER GATEWAY PROTOCOL TO EXPOSE MAXIMUM SEGMENT IDENTIFIER DEPTH TO AN EXTERNAL APPLICATION

CROSS-REFERENCE TO RELATED APPLICATIONS

This application is a continuation of U.S. application Ser. No. 15/947,737, filed Apr. 6, 2018 (now U.S. Pat. No. 10,673,753 issued Jun. 2, 2020), which is a continuation of U.S. application Ser. No. 14/846,342, filed Sep. 4, 2015 (now U.S. Pat. No. 9,967,184 issued May 8, 2018), which claims the benefit of U.S. Provisional Application No. 62/188,402, filed Jul. 2, 2015, which are hereby incorporated by reference.

TECHNICAL FIELD

Embodiments of the invention relate to the field of packet networks, and more specifically, to segment routing.

BACKGROUND ART

Segment Routing (SR) is a packet forwarding technology based on source routing. A variety of use-cases for SR have been described in the Internet Engineering Task Force (IETF) draft "draft.filsfils-rtgwg-segment-routing-use-cases," which is hereby incorporated by reference. An abstract routing model for SR is described in an IETF draft "draft.filsfils-rtgwg-segment-routing," which is hereby incorporated by reference. The IETF draft "draft.filsfils-rtgwg-segment-routing" describes the instantiation of SR using Internet Protocol version 6 (IPv6) or Multiprotocol Label Switching (MPLS).

SUMMARY

A method implemented by a network device acting as a border gateway protocol (BGP) speaker, of exposing a maximum segment identifier depth (MSD) value of the network device is described. The method comprises encoding the MSD value into a BGP Link State (BGP-LS) extension message. The BGP-LS extension message includes a type, a length and a MSD value. The type indicates the type of the MSD value, the length indicates the length of the MSD value and the MSD value indicates a lowest MSD value supported by the network device for enabling segment routing. The method continues with transmitting the BGP-LS extension message including the type, the length, and the MSD value to a network controller, where the network controller is to use the MSD value to compute a segment routing path including the network device.

A network device acting as a border gateway protocol (BGP) speaker is disclosed. The network device is to be coupled to a network controller. The network device comprises a processor and a memory, said memory containing instructions executable by the processor. The network device is operative to encode a maximum segment identifier depth (MSD) value of the network device into a BGP Link State (BGP-LS) extension message. The BGP-LS extension message includes a type, a length and a MSD value. The type indicates the type of the MSD value, the length indicates the length of the MSD value and the MSD value indicates a lowest MSD value supported by the network device for enabling segment routing. The network device is further operative to transmit the BGP-LS extension message including the type, the length, and the MSD value to the network controller, wherein the network controller is to use the MSD value to compute a segment routing path including the network device.

A non-transitory machine-readable storage medium is disclosed. The non-transitory machine-readable storage medium provides instructions that, if executed by a processor of a network device acting as a border gateway protocol (BGP) speaker and coupled with a network controller, will cause said processor to perform operations. The operations comprise encoding a maximum segment identifier depth (MSD) value of the network device into a BGP Link State (BGP-LS) extension message. The BGP-LS extension message includes a type, a length and a MSD value. The type indicates the type of the MSD value, the length indicates the length of the MSD value and the MSD value indicates a lowest MSD value supported by the network device for enabling segment routing. The operations further comprise transmitting the BGP-LS extension message including the type, the length, and the MSD value to the network controller, wherein the network controller is to use the MSD value to compute a segment routing path including the network device.

A method in a network controller is disclosed. The method comprises receiving from a network device acting as a border gateway protocol (BGP) speaker, a BGP Link State (BGP-LS) extension message. The method continues with decoding the BGP-LS extension message, to extract a maximum segment identifier depth (MSD) value of the network device. The BGP-LS extension message includes a type which indicates the type of the MSD value, a length which indicates the length of the MSD value and the MSD value which indicates a lowest MSD value supported by the network device for enabling segment routing. The method further includes computing, using the MSD value, a segment routing (SR) path including the network device, where the SR path has a label stack depth that is lower than or equal to the MSD value.

A network controller is disclosed. The network controller comprises a processor and a memory, said memory containing instructions executable by the processor. The network controller is operative to receive from a network device acting as a border gateway protocol (BGP) speaker, a BGP Link State (BGP-LS) extension message. The network controller is further operative to the BGP-LS extension message, to extract a maximum segment identifier depth (MSD) value of the network device. The BGP-LS extension message includes a type which indicates the type of the MSD value, a length which indicates the length of the MSD value and the MSD value which indicates a lowest MSD value supported by the network device for enabling segment routing. The network controller is further operative to compute, using the MSD value, a segment routing (SR) path including the network device, wherein the SR path has a label stack depth that is lower than or equal to the MSD value.

A non-transitory machine-readable storage medium is disclosed. The non-transitory machine-readable storage medium provides instructions that, if executed by a processor of a network controller, will cause said processor to perform operations. The operations comprise receiving from a network device acting as a border gateway protocol (BGP) speaker, a BGP Link State (BGP-LS) extension message. The operations further comprise decoding the BGP-LS extension message, to extract a maximum segment identifier depth (MSD) value of the network device. The BGP-LS extension message includes a type which indicates the type of the MSD value, a length which indicates the length of the MSD value and the MSD value which indicates a lowest MSD value supported by the network device for enabling segment routing. The operations further comprise computing, using the MSD value, a segment routing (SR) path including the network device, wherein the SR path has a label stack depth that is lower than or equal to the MSD value.

BRIEF DESCRIPTION OF THE DRAWINGS

The invention may best be understood by referring to the following description and accompanying drawings that are used to illustrate embodiments of the invention. In the drawings:

FIG. 2 illustrates a flow diagram of operations performed in a network device for exposing an MSD value in accordance with some embodiments of the invention.

FIG. 3 illustrates a flow diagram of operations performed in a network controller in accordance with some embodiments of the invention.

DETAILED DESCRIPTION

Figure 1:
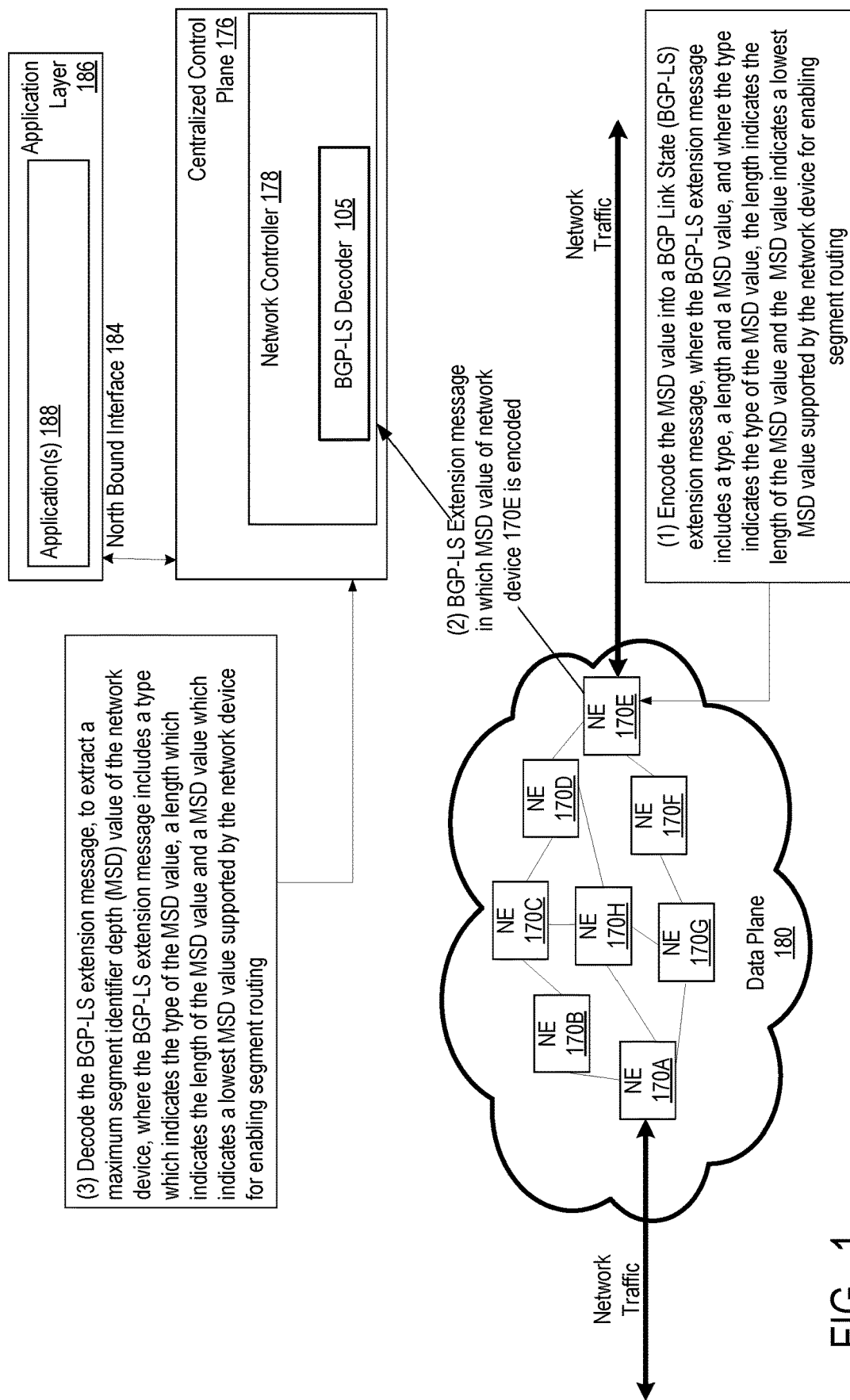
FIG. 1 is a block diagram illustrating SR network enabling transmission of maximum segment identifier (SID) depth (MSD) to external applications according to some embodiments of the invention.

The following description describes methods and apparatus for exposing a maximum segment identifier depth (MSD) value associated with a network device. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device or a computing device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP)) that communicate with other network devices to exchange routes and select those routes based on one or more routing metrics.

A control plane or a component external to the network may perform computations based on the network topology and current state of the connections within the network, including traffic engineering information. For example in order to determine segment routing paths, the processing component (e.g., control plane, SDN controller, Path Computation Element (PCE), etc.) needs to gather information about the topologies and capabilities of each network device of the SR network in order to properly configure it. In Segment Routing (SR), a network node (e.g., a SR-capable network device) steers a packet through the network by utilizing a set of instructions, herein referred to as segments. The segments are included as part of an SR header which has been prepended onto the packet at the ingress of an SR network. A segment can represent any topological or service instruction. SR architecture can be applied to the MPLS data plane with no change in the forwarding plane. SR, when applied to the MPLS data plane, provides the ability to tunnel services (e.g., Virtual Private Network (VPN), Virtual Private Local LAN Service (VPLS), Virtual Private Wire Service (VPWS)) from an ingress Label Switched Router (LSR) to an egress LSR, without any protocol other than IS-IS or OSPF. A segment is encoded as an MPLS label. An ordered list of segments is encoded as a stack of labels. The next segment to process is on the top of the stack. Upon completion of a segment, the corresponding label is popped from the stack.

In particular, a control plane needs to gather information about the maximum segment identifier (SID) depth (MSD) of each network node being configured, such that the controller does not configure the network node with a path/tunnel which would have a SID (or label stack) deeper than the network node is capable of imposing. The "Maximum SID Depth" (MSD) specifies the maximum number of SIDs (i.e., segments or label stacks) that a SR network node is capable of imposing on a packet.

In one approach, the control plane may use the Path Computation Element Communication Protocol (PCEP) to retrieve the MSD of a SR network node. PCEP is a set of rules that allows a Path Computation Client (PCC) (e.g., the network node being configured by the control plane) to request path computations from Path Computation Elements (PCEs) (e.g., the control plane). According to PCEP, the MSD is transferred to the control plane via a PCEP extension "SR PCE Capability TLV/METRIC Object," as discussed in "draft-ietf-pce-segment-routing" (which is hereby incorporated by reference).

In another approach, the MSD value for each network node may be transferred to the control plane with the Interior Gateway Protocol(s) (IGP). In this approach, the sub-TLV, called RLSDC sub-TLV, is defined to advertise the capability of the network node to read the maximum label stack depth (i.e., MSD of the network device) as defined for OSPF and IS-IS in "draft-ietf-ospf-mpls-elc" and "draft-ietf-isis-mpls-elc" respectively (which are hereby incorporated by reference).

Challenges with Exposing MSD to a Network Controller

Although PCEP may be used to expose the MSD of a network node to another network device (e.g., the control plane), when PCEP is not supported by a network node (in particular the head-end of the SR path/tunnel), or if the network node does not participate in IGP routing, the control plane does not have any method to learn the MSD of the network node being configured. This results in the control plane making arbitrary decisions with regards to the label stack depth of the network node being configured, which may result in an erroneous configuration of the network node, leading to packet drops. In addition, PCEP and IGP do not allow a control plane to obtain the MSD of a link within the network node, and only allows the control plane to get the global node MSD.

The embodiments presented herein overcome the limitations of the previous approaches. According to some embodiments, a method implemented by a network device acting as a border gateway protocol (BGP) speaker, of transmitting a maximum segment identifier depth (MSD) value associated with the network device, to a network controller is disclosed. In these embodiments, a MSD value of the network device is encoded into a BGP Link State (BGP-LS) extension message. The BGP-LS extension message includes, a type that indicates the type of the MSD value, a length which indicate the length of the MSD value and the MSD value that indicates a lowest node MSD value of the network device. In other embodiments, the MSD value is a link MSD value indicative of a lowest MSD value for each link of the network device. The BGP-LS extension message is then transmitted to the network controller, wherein the network controller is to use the MSD value when calculating the segment routing path including the network device.

BGP-LS as described in "draft-ietf-idr-1s-distribution-11" (which is hereby incorporated by reference), describes a mechanism by which links state and traffic engineering information can be collected from networks and shared with external components (e.g., control plane, centralized controller, PCE, etc.) using the BGP routing protocol.

FIG. 1 is a block diagram illustrating SR network enabling transmission of maximum segment identifier (SID) depth (MSD) to external applications according to some embodiments.

FIG. 1, illustrates a centralized control plane 176 coupled with a data plane 180 (sometimes referred to as the infrastructure layer, network forwarding plane, or forwarding plane (which should not be confused with a ND forwarding plane)) that includes the network elements (NEs) 170A-H (sometimes referred to as routers, switches, forwarding elements, data plane elements, or nodes). The centralized control plane 176 includes a network controller 178, which includes a centralized reachability and forwarding information module (not illustrated) that determines the reachability within the network and distributes the forwarding information to the NEs 170A-H of the data plane 180. In these embodiments, the network intelligence is centralized in the centralized control plane 176 executing on electronic devices that are typically separate from the NDs.

FIG. 1 also shows that the centralized control plane 176 has a north bound interface 184 to an application layer 186, in which resides application(s) 188. The centralized control plane 176 has the ability to form virtual networks (sometimes referred to as a logical forwarding plane, network services, or overlay networks (with the NEs 170A-H of the data plane 180 being the underlay network)) for the application(s) 188. Thus, the centralized control plane 176 maintains a global view of all NDs and configured NEs/VNEs, and it maps the virtual networks to the underlying NDs efficiently (including maintaining these mappings as the physical network changes either through hardware (ND, link, or ND component) failure, addition, or removal). Each network element NE 170A-H may be implemented by one or more network devices, as it is described in further detail below.

The NE 170E includes a MSD value which is an indication of the capabilities of the node and/or a link of the node. In some embodiments, the MSD value is a numeric value in the range of [0, 254] that is statically configured in the NE 170E. In alternative embodiments, the MSD value is redistributed from an IGP node. In some embodiments, the MSD value is uniquely associated with the network device.

The MSD value may be a node MSD value, which indicates the maximum number of labels (SIDs) supported by the NE 170E. In some embodiments, a value of 0 means that NE 170E is not operable to push an SR stack of any length and should not be used for such functionality. Alternatively, the MSD value may be a link MSD value which indicates a maximum number of labels (SIDs) supported by a link of the NE 170E. In some embodiments, a value of 0 means the link is not operable to push an SR stack of any length and should not be used for such functionality.

The NE 170E and the network controller 178 are configured to include BGP and to act as BGP speakers in the network 100. During a peering handshake, OPEN messages are exchanged between the two BGP speakers (NE 170E and network controller 178). NE 170E and the network controller 178 negotiate capabilities of the session. In order for the two BGP speakers (NE 170E and network controller 178) to exchange Link-State Network Layer Reachability Information (NLRI), they use BGP Capabilities Advertisement to ensure that they both are capable of properly processing such NLRI. The negotiation of the capabilities includes the verification that each one of the NE 170E and the network controller 178 is capable of supporting the new functionality of BGP-LS presented herein for transmission of a BGP-LS extension message in which the MSD value of the NE 170E is encoded.

Following the negotiation of the capabilities, NE 170E, at task box (1), encodes the MSD value into a BGP Link State (BGP-LS) extension message to be transmitted to the network controller 178. The BGP-LS extension message includes a type which indicates the type of the MSD value, a length which indicates the length of the MSD value and an MSD value which indicates a lowest MSD value supported by the network node for enabling a segment routing path.

Figure 4A:
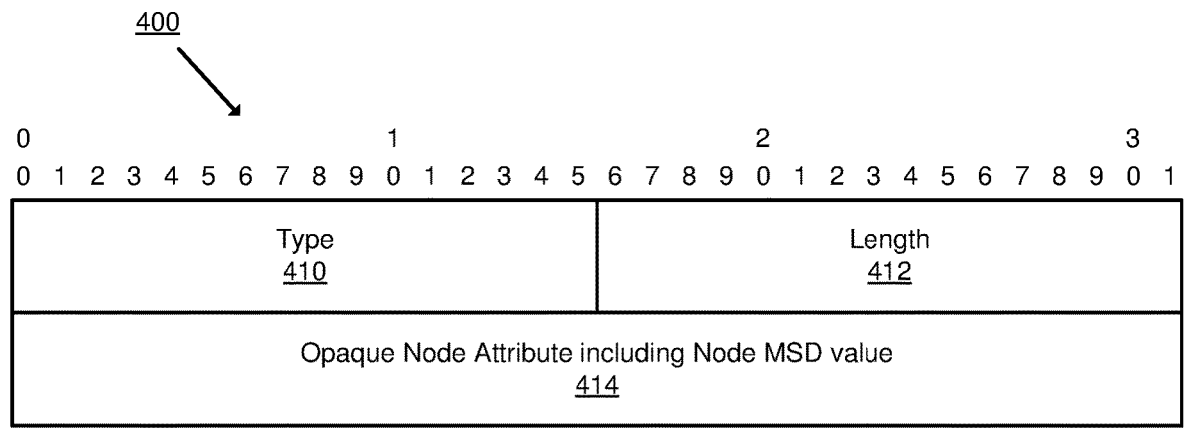
FIG. 4A illustrates an exemplary opaque node attribute Type-Length-Value (TLV) including a node MSD value of a network device in accordance with some embodiments.

In some embodiments, the MSD value is the node MSD value of NE 170E. In some of these embodiments, the node MSD value is encoded in an Opaque Node Attribute Type-Length-Value (TLV) of BGP-LS. The Opaque Node Attribute TLV is an envelope that carries node attribute TLVs advertised by a network element. In embodiments of the invention, the Opaque Node Attribute TLV is used to carry the node MSD value of NE 170E. The NE 170E uses the Opaque Node Attribute TLV to advertise to other BGP speakers (e.g., network controller 178) its associated node MSD value. FIG. 4A illustrates an exemplary opaque node attribute TLV including a node MSD value of a network element in accordance with some embodiments. The opaque node attribute TLV is a container 400 of type TLV (Type-Length-Value). The type 410 includes a value identifying the type of the value transmitted within the container 400, the length 412 specifies the length of the value transmitted within the container 400, and the opaque node attribute 414 includes the MSD value associated with the NE 170E. In some embodiments, the MSD value is a value from the range [0, 254] and indicates the maximum number of labels (SIDs) supported by the NE 170E.

Figure 4B:
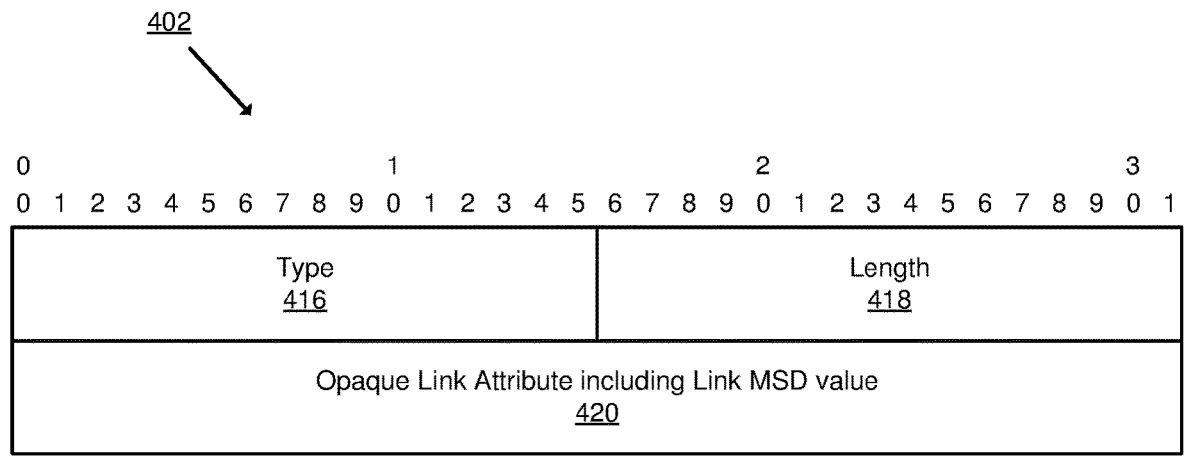
FIG. 4B illustrates an exemplary opaque link attribute TLV including a link MSD value of a network device in accordance with some embodiments.

In other embodiments, the MSD value is a link MSD of NE 170E. The Opaque Link Attribute TLV is an envelope that carries link attribute TLVs advertised by a network element. The NE 170E uses the Opaque Link Attribute TLV to advertise to other BGP speakers (e.g., network controller 178) its associated link MSD. FIG. 4B illustrates an exemplary opaque link attribute TLV including a link MSD value of a network element in accordance with some embodiments. The opaque node attribute TLV is a container 402 of type TLV (Type-Length-Value). The type 416 includes a value identifying the type of the value transmitted within the container 402 (e.g., link MSD type), the length 418 specifies the length of the value transmitted within the container 402, and the opaque link attribute 420 includes the link MSD value associated with the NE 170E. In some embodiments, the link MSD value is a value from the range [0, 254] and indicates the lowest maximum number of labels (SIDs) supported by a link of the NE 170E.

Referring back to FIG. 1, at task box (2), the MSD value of NE 170E is transmitted to the network controller 178. In some embodiments, following the encoding of the MSD value in a BGP-LS extension message (e.g., opaque node attribute TLV or opaque link attribute TLV), the message is advertised to all BGP speakers coupled with NE 170E.

At task box (3), the network controller 178 decodes the BGP-LS extension message, to extract a maximum segment identifier depth (MSD) value of the network device. The BGP-LS extension message includes a type which indicates the type of the MSD value, a length which indicates the length of the MSD value and an MSD value which indicates a lowest MSD value supported by the network device for enabling segment routing. In some embodiments, once the message is decoded and the MSD value is extracted, the network controller 178 uses the MSD value to compute a segment routing path which includes NE 170E such that the label stack depth of the routing path computed does not exceed the MSD value supported by the network element 170E. In some embodiments, the MSD value is uniquely associated with the network device.

In some embodiments, the network element 170E is a network node which is the head-end of a SR tunnel/path. Thus the MSD value sent to the network controller 178 enables the network controller to compute a SR path allowing the network element 170E to push a complete label (SID) stack of maximum depth equal to the MSD value.

Thus the embodiments presented herein describe an efficient way of exposing the MSD value of a network node to external applications (e.g., PCE/SDN controller, network controller) with the use of BGP-LS extensions. The embodiments enable an external application to receive MSD information related to a network element at a finer granularity than prior approaches. Contrary to the prior approaches which enable a network device to only expose the node MSD value of the network node, the mechanisms described with reference to the FIGS. 1-4B enable a network device to expose its associated MSD values at the link level in addition to being able to expose the node MSD value.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

FIG. 2 illustrates a flow diagram of operations 200 performed in a network device for exposing an MSD value of the network device in accordance with some embodiments. At block 202, the NE 170E encodes the MSD value into a BGP Link State (BGP-LS) extension message. The BGP-LS extension message includes a type, a length and a MSD value, and where the type indicates the type of the MSD value, the length indicates the length of the MSD value and the MSD value indicates a lowest MSD value supported by the network device for enabling segment routing. Flow then moves to block 203.

At block 203, NE 170E transmits the BGP-LS extension message including the MSD value to the network controller 178. The network controller 178 is operative to use the received MSD value to compute a segment routing path including the network device. In some embodiments, the network element 170E is a network node which is the head-end of a SR tunnel/path. Thus the MSD value sent to the controller enables the controller to compute a SR path allowing the network element to push a complete label (SID) stack of maximum depth equal to the MSD value.

FIG. 3 illustrates a flow diagram of operations performed in a network controller in accordance with some embodiments. At block 302, the network controller 178 receives from a network device (e.g., NE 170E) acting as a border gateway protocol (BGP) speaker, a BGP Link State (LS) extension message. Flow then moves to block 304.

At block 304, the network controller 178 decodes the BGP-LS extension message, to extract a maximum segment identifier depth (MSD) value of the network device. The BGP-LS extension message includes a type which indicates the type of the MSD value, a length which indicates the length of the MSD value and a MSD value which indicates a lowest MSD value supported by the network device for enabling segment routing. In some embodiments, the MSD value is uniquely associated with the network device.

At block 306, the network controller computes, using the extracted MSD value, a segment routing (SR) path including the network device, where the SR path has a label stack depth that is lower than or equal to the MSD value. In some embodiments, the network element 170E is a network node which is the head-end of a SR tunnel/path. Thus the MSD value sent to the controller enables the controller to compute a SR path allowing the network node to push a complete label (SID) stack of maximum depth equal to the MSD value.

While embodiments of the invention have been described with a network device transmitting an MSD value encoded in a BGP-LS extension message to a network controller of a control plane, the invention is not so limited. Alternative embodiments could be implemented such that the MSD value is transmitted to any type of network element coupled with the network device and operative to decode a BGP-LS extension message including the MSD value.

Architecture

Typically, a network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

Figure 5A:
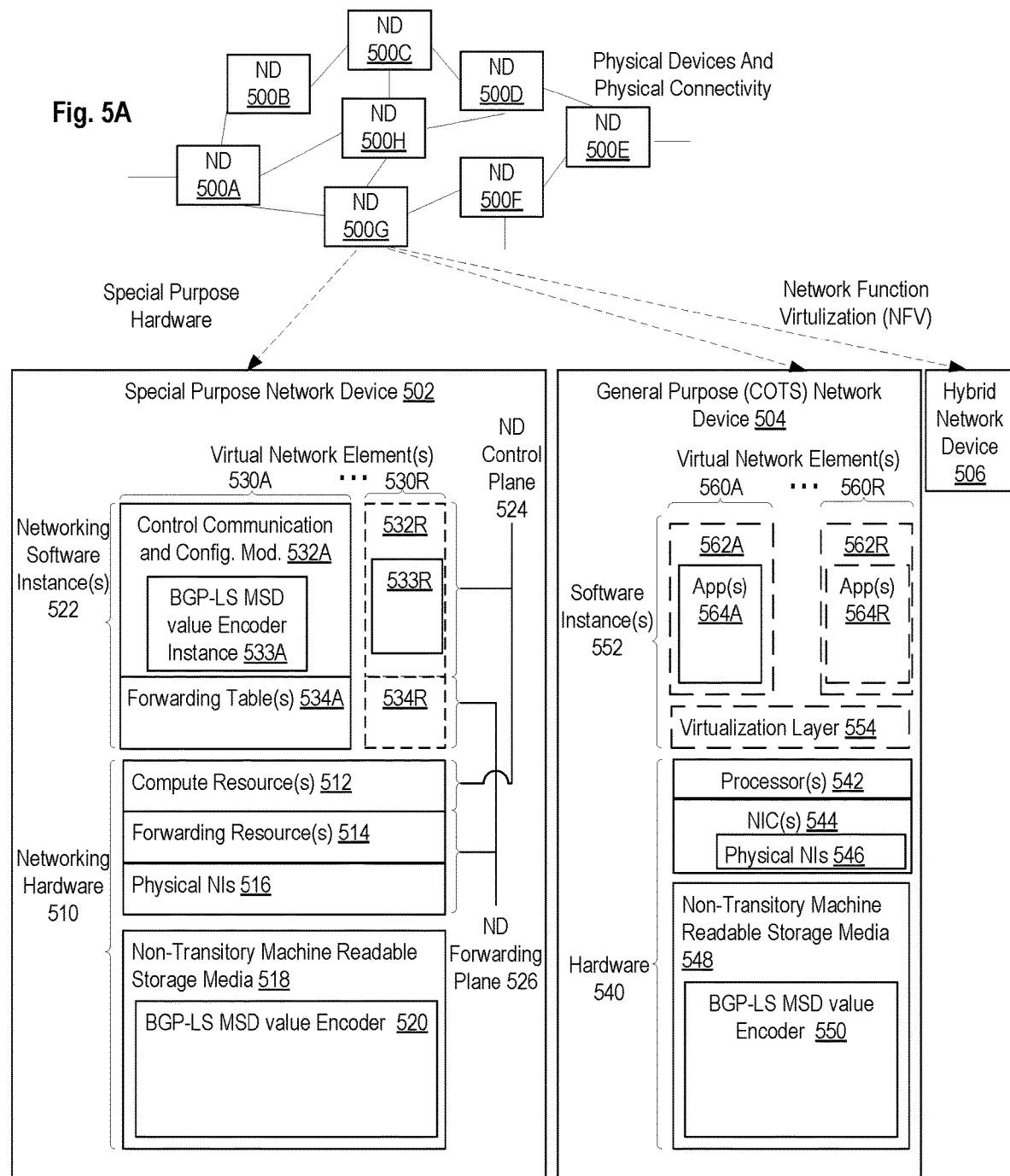
FIG. 5A illustrates connectivity between network devices (NDs) within an exemplary network, as well as three exemplary implementations of the NDs, according to some embodiments of the invention.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the BGP-LS MSD value encoder 520 may be executed by the networking hardware 510 to instantiate a set of one or more networking software instance(s) 522 which include BGP-LS MSD value encoder instances 533A-R. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. During operation, the BGP-LS MSD value encoder is operative to perform operations described with reference to FIGS. 1, 2, and 4A-4B. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
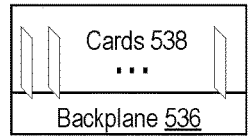
FIG. 5B illustrates an exemplary way to implement a special-purpose network device according to some embodiments of the invention.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization—represented by a virtualization layer 554 and software containers 562A-R. For example, one such alternative embodiment implements operating system-level virtualization, in which case the virtualization layer 554 represents the kernel of an operating system (or a shim executing on a base operating system) that allows for the creation of multiple software containers 562A-R that may each be used to execute one of the sets of applications 564A-R. In this embodiment, the multiple software containers 562A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 554 represents a hypervisor (sometimes referred to as a virtual machine monitor (VMM)) or a hypervisor executing on top of a host operating system; and 2) the software containers 562A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 564A-R, as well as the virtualization layer 554 and software containers 562A-R if implemented, are collectively referred to as software instance(s) 552. Each set of applications 564A-R, corresponding software container 562A-R if implemented, and that part of the hardware 540 that executes them (be it hardware dedicated to that execution and/or time slices of hardware temporally shared by software containers 562A-R), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 562A-R differently. For example, while embodiments of the invention are illustrated with each software container 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 562A-R to VNEs also apply to embodiments where such a finer level of granularity is used.

In certain embodiments, the virtualization layer 554 includes a virtual switch that provides similar forwarding services as a physical Ethernet switch. Specifically, this virtual switch forwards traffic between software containers 562A-R and the NIC(s) 544, as well as optionally between the software containers 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 5C:
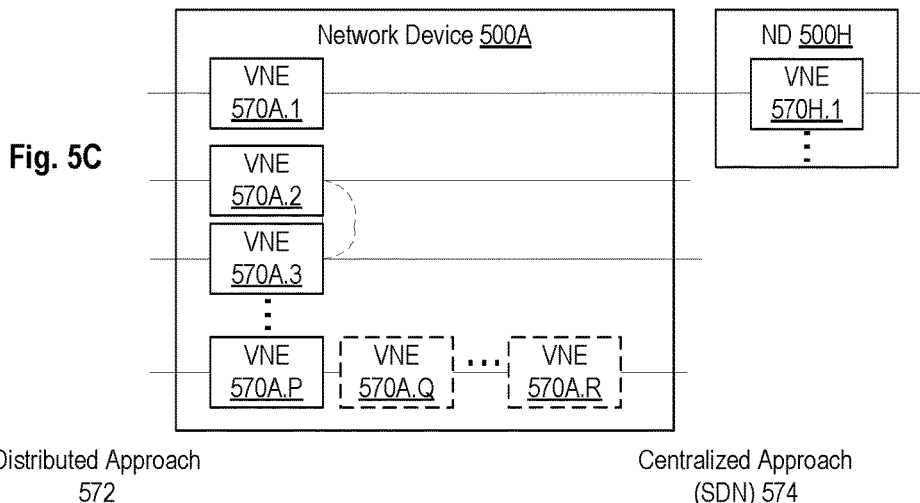
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software containers 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
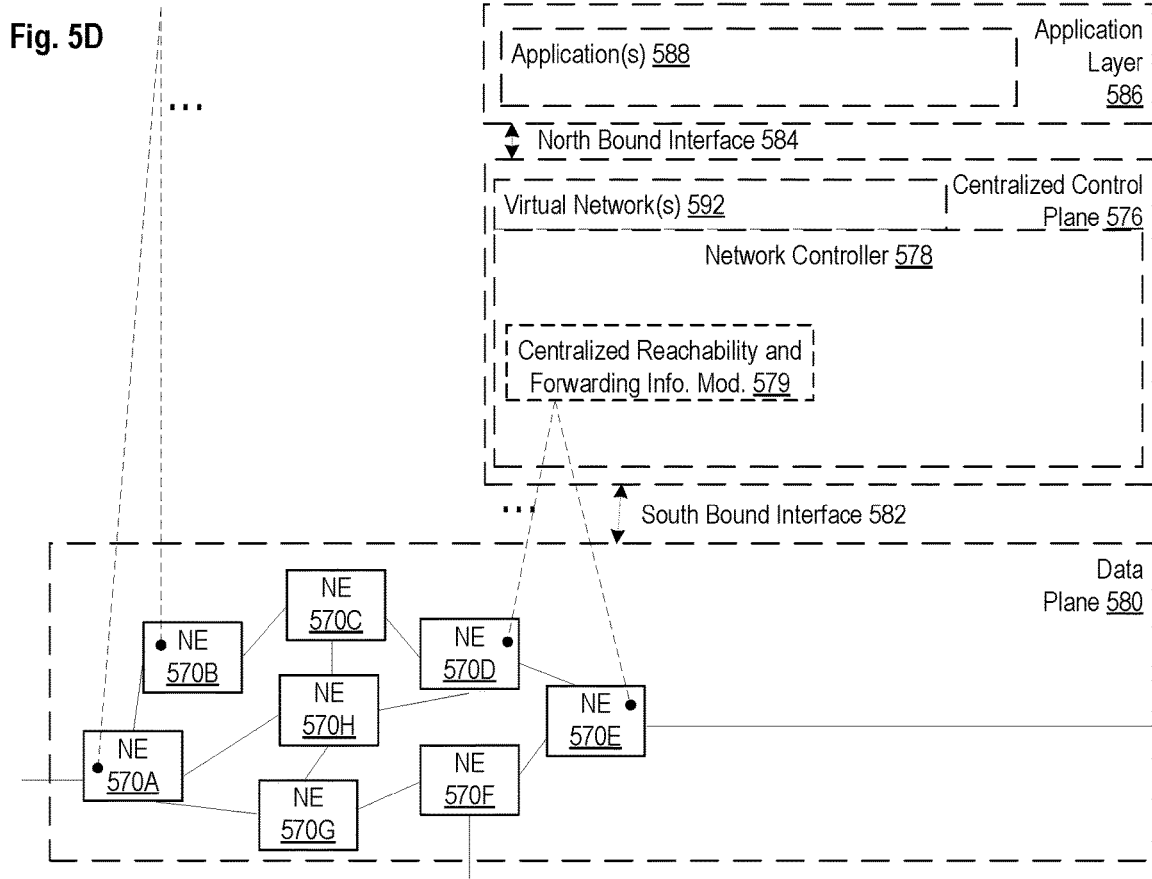
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
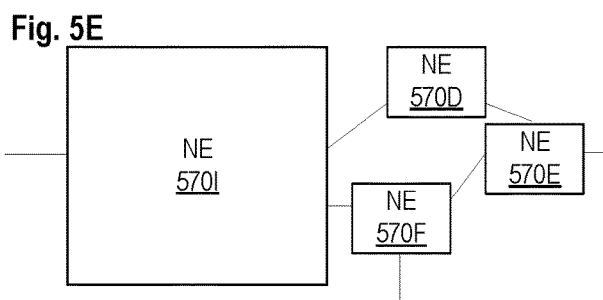
FIG. 5E illustrates the simple case of where each of the NDs implements a single NE, but a centralized control plane has abstracted multiple of the NEs in different NDs into (to represent) a single NE in one of the virtual network(s), according to some embodiments of the invention.
Figure 5F:
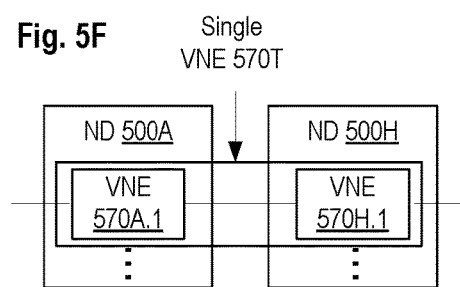
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments of the invention. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
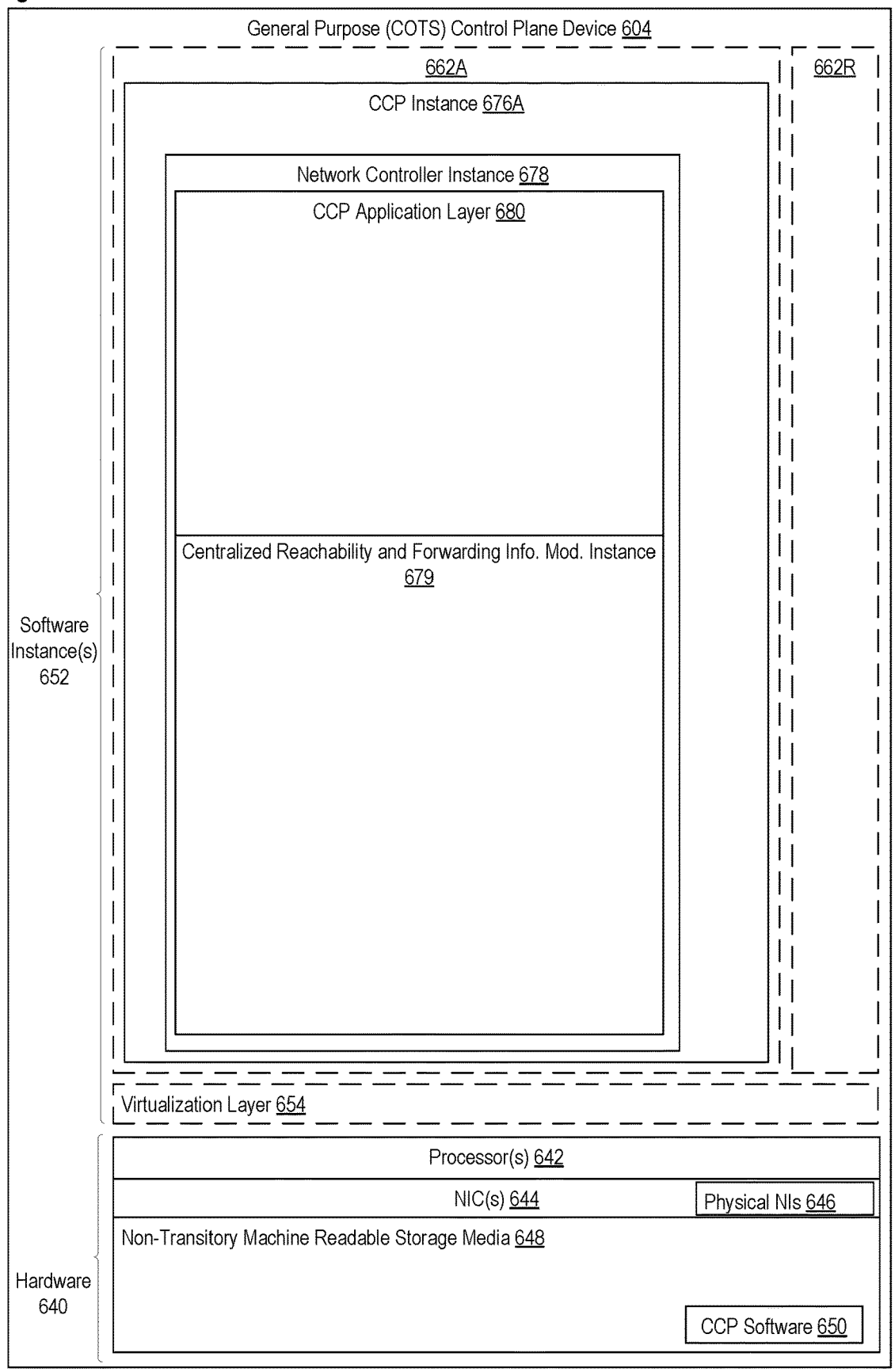
FIG. 6 illustrates a general purpose control plane device with centralized control plane (CCP) software 650, according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650.

In embodiments that use compute virtualization, the processor(s) 642 typically execute software to instantiate a virtualization layer 654 and software container(s) 662A-R (e.g., with operating system-level virtualization, the virtualization layer 654 represents the kernel of an operating system (or a shim executing on a base operating system) that allows for the creation of multiple software containers 662A-R (representing separate user space instances and also called virtualization engines, virtual private servers, or jails) that may each be used to execute a set of one or more applications; with full virtualization, the virtualization layer 654 represents a hypervisor (sometimes referred to as a virtual machine monitor (VMM)) or a hypervisor executing on top of a host operating system, and the software containers 662A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 650 (illustrated as CCP instance 676A) is executed within the software container 662A on the virtualization layer 654. In embodiments where compute virtualization is not used, the CCP instance 676A on top of a host operating system is executed on the "bare metal" general purpose control plane device 604. The instantiation of the CCP instance 676A, as well as the virtualization layer 654 and software containers 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user—interfaces). At a more abstract level, this CCP application layer 680 within the centralized control plane 576 works with virtual network view(s) (logical view(s) of the network) and the middleware layer provides the conversion from the virtual networks to the physical view.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network node, the method comprising: transmitting to a centralized controller an attribute Type Length Value (TLV), wherein a type of the attribute TLV includes a type of a maximum segment identifier depth (MSD) indicating that the MSD is a link MSD, a length of the attribute TLV includes a length of the MSD, and a value of the attribute TLV includes the MSD, which is a maximum number of segment routing (SR) labels supported at one link of a plurality of links of the network node, wherein the centralized controller is to use the attribute TLV to compute an SR tunnel with one or more SR labels, a label stack depth of the SR tunnel does not exceed the MSD, and the SR labels are used for steering a packet through an SR network.

2. The method of claim 1, wherein the attribute TLV is a Border Gateway Protocol Link State (BGP-LS) extension message.

3. The method of claim 2 further comprising: negotiating capabilities of a BGP session; and verifying that the centralized controller supports reception of MSDs in BGP-LS extension messages.

4. The method of claim 3, wherein transmitting to the centralized controller the attribute TLV is performed in response to verifying that the centralized controller supports reception of MSDs in BGP-LS extension messages.

5. The method of claim 1, wherein the network node does not support Path Computation Element Communication Protocol (PCEP) and does not participate in Interior Gateway Protocol(s) (IGP).

6. The method of claim 1, wherein the network node is an ingress node of the SR tunnel.

7. A network node, comprising: a processor and a memory, said memory containing instructions executable by the processor to cause the network node to: transmit to a centralized controller an attribute Type Length Value (TLV), wherein a type of the attribute TLV includes a type of a maximum segment identifier depth (MSD) indicating that the MSD is a link MSD, a length of the attribute TLV includes a length of the MSD, and a value of the attribute TLV includes the MSD, which is a maximum number of segment routing (SR) labels supported at one link of a plurality of links of the network node, wherein the centralized controller is to use the attribute TLV to compute an SR tunnel with one or more SR labels, a label stack depth of the SR tunnel does not exceed the MSD, and the SR labels are used for steering a packet through an SR network.

8. The network node of claim 7, wherein the attribute TLV is a Border Gateway Protocol Link State (BGP-LS) extension message.

9. The network node of claim 8, wherein the instructions executable by the processor are further to cause the network node to: negotiate capabilities of a BGP session; and verify that the centralized controller supports reception of MSDs in BGP-LS extension messages.

10. The network node of claim 9, wherein to transmit to the centralized controller the attribute TLV is performed in response to verifying that the centralized controller supports reception of MSDs in BGP-LS extension messages.

11. The network node of claim 7, wherein the network node does not support Path Computation Element Communication Protocol (PCEP) and does not participate in Interior Gateway Protocol(s) (IGP).

12. The network node of claim 7, wherein the network node is an ingress node of the SR tunnel.

13. A non-transitory machine-readable storage medium that provides instructions that, if executed by a processor of a network node, will cause said processor to perform operations comprising: transmitting to a centralized controller an attribute Type Length Value (TLV), wherein a type of the attribute TLV includes a type of a maximum segment identifier depth (MSD) indicating that the MSD is a link MSD, a length of the attribute TLV includes a length of the MSD, and a value of the attribute TLV includes the MSD, which is a maximum number of segment routing (SR) labels supported at one link of a plurality of links of the network node, wherein the centralized controller is to use the attribute TLV to compute an SR tunnel with one or more SR labels, a label stack depth of the SR tunnel does not exceed the MSD, and the SR labels are used for steering a packet through an SR network.

14. The non-transitory machine-readable storage medium of claim 13, wherein the attribute TLV is a Border Gateway Protocol Link State (BGP-LS) extension message.

15. The non-transitory machine-readable storage medium of claim 14, wherein the operations further comprise: negotiating capabilities of a BGP session; and verifying that the centralized controller supports reception of MSDs in BGP-LS extension messages.

16. The non-transitory machine-readable storage medium of claim 15, wherein transmitting to the centralized controller the attribute TLV is performed in response to verifying that the centralized controller supports reception of MSDs in BGP-LS extension messages.

17. The non-transitory machine-readable storage medium of claim 13, wherein the network node does not support Path Computation Element Communication Protocol (PCEP) and does not participate in Interior Gateway Protocol(s) (IGP).

18. The non-transitory machine-readable storage medium of claim 13, wherein the network node is an ingress node of the SR tunnel.

19. A method in a network controller, the method comprising: receiving from a network node an attribute Type Length Value (TLV), wherein a type of the attribute TLV includes a type of a maximum segment identifier depth (MSD) indicating that the MSD is a link MSD, a length of the attribute TLV includes a length of the MSD, and a value of the attribute TLV includes a value of the MSD, which is a maximum number of segment routing (SR) labels supported at one link of a plurality of links of the network node; and using the attribute TLV to compute an SR tunnel with one or more SR labels, wherein a label stack depth of the SR tunnel does not exceed the MSD, and the SR labels are used for steering a packet through an SR network that includes the network node.

20. The method of claim 19, wherein the attribute TLV is a Border Gateway Protocol Link State (BGP-LS) extension message.

21. The method of claim 20 further comprising: negotiating capabilities of a BGP session; and verifying that the network node supports transmission of MSDs in BGP-LS extension messages.

22. The method of claim 19, wherein the network node does not support Path Computation Element Communication Protocol (PCEP) and does not participate in Interior Gateway Protocol(s) (IGP).

23. A centralized controller comprising: a processor and a memory, said memory containing instructions executable by the processor to cause the centralized controller to: receive from a network node an attribute Type Length Value (TLV), wherein a type of the attribute TLV includes a type of a maximum segment identifier depth (MSD) indicating that the MSD is a link MSD, a length of the attribute TLV includes a length of the MSD, and a value of the attribute TLV includes a value of the MSD, which is a maximum number of segment routing (SR) labels supported at one link of a plurality of links of the network node, and use the attribute TLV to compute an SR tunnel with one or more SR labels, wherein a label stack depth of the SR tunnel does not exceed the MSD, and the SR labels are used for steering a packet through an SR network that includes the network node.

24. The centralized controller of claim 23, wherein the attribute TLV is a Border Gateway Protocol Link State (BGP-LS) extension message.

25. The centralized controller of claim 24, wherein the instructions executable by the processor are further to cause the centralized controller to: negotiate capabilities of a BGP session; and verify that the network node supports transmission of MSDs in BGP-LS extension messages.

26. The centralized controller of claim 23, wherein the network node does not support Path Computation Element Communication Protocol (PCEP) and does not participate in Interior Gateway Protocol(s) (IGP).

27. A non-transitory machine-readable storage medium that provides instructions that, if executed by a processor of a centralized controller, will cause said processor to perform operations comprising: receiving from a network node an attribute Type Length Value (TLV), wherein a type of the attribute TLV includes a type of a maximum segment identifier depth (MSD) indicating that the MSD is a link MSD, a length of the attribute TLV includes a length of the MSD, and a value of the attribute TLV includes a value of the MSD, which is a maximum number of segment routing (SR) labels supported at one link of a plurality of links of the network node; and using the attribute TLV to compute an SR tunnel with one or more SR labels, wherein a label stack depth of the SR tunnel does not exceed the MSD, and the SR labels are used for steering a packet through an SR network that includes the network node.

28. The non-transitory machine-readable storage medium of claim 27, wherein the attribute TLV is a Border Gateway Protocol Link State (BGP-LS) extension message.

29. The non-transitory machine-readable storage medium of claim 28 further comprising: negotiating capabilities of a BGP session: and verifying that the network node supports transmission of MSDs in BGP-LS extension messages.

30. The non-transitory machine-readable storage medium of claim 27, wherein the network node does not support Path Computation Element Communication Protocol (PCEP) and does not participate in Interior Gateway Protocol(s) (IGP).

* * * * *